(12) United States Patent
Kawashima (10) Patent No.: US 11,514,482 B2
(45) Date of Patent: Nov. 29, 2022

(54) SYSTEMS AND METHODS FOR ESTIMATING A REMAINING VALUE

(71) Applicant: Honda Motor Co., Ltd., Tokyo (JP)

(72) Inventor: Kiyotaka Kawashima, Los Angeles, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 369 days.

(21) Appl. No.: 16/563,101

(22) Filed: Sep. 6, 2019

(65) Prior Publication Data

US 2021/0073873 A1    Mar. 11, 2021

(51) Int. Cl.
*G06Q 30/02*    (2012.01)
*G07C 5/08*    (2006.01)

(52) U.S. Cl.
CPC ....... *G06Q 30/0278* (2013.01); *G07C 5/0808* (2013.01)

(58) Field of Classification Search
None
See application file for complete search history.

(56) References Cited

U.S. PATENT DOCUMENTS

| | | | |
|---|---|---|---|
| 8,595,034 B2* | 11/2013 | Bauer | G06Q 40/02 705/4 |
| 9,208,526 B1 | 12/2015 | Leise | |
| 9,773,251 B2 | 9/2017 | Liu et al. | |
| 9,886,771 B1* | 2/2018 | Chen | G06F 3/04845 |
| 9,892,567 B2 | 2/2018 | Binion et al. | |
| 10,246,037 B1* | 4/2019 | Shea | B60R 21/0132 |
| 10,510,142 B1* | 12/2019 | Dohner | G06T 7/97 |
| 11,379,886 B1* | 7/2022 | Fields | G06Q 30/0278 |
| 2002/0177926 A1* | 11/2002 | Lockwood | G06Q 10/20 701/1 |

(Continued)

FOREIGN PATENT DOCUMENTS

| CN | 106204138 | 12/2016 |
|---|---|---|
| CN | 108961471 | 12/2018 |

(Continued)

OTHER PUBLICATIONS

White, J., Thompson, C., Turner, H et al. WreckWatch: Automatic Traffic Accident Detection and Notification with Smartphones. Mobile Netw Appl 16, 285 (2011). https://doi.org/10.1007/s11036-011-0304-8 (Year: 2011).*

(Continued)

*Primary Examiner* — Paul R Fisher
(74) *Attorney, Agent, or Firm* — Rankin, Hill & Clark LLP (57) ABSTRACT

Systems and methods for estimating a remaining value for a host vehicle. In one embodiment, a computer-implemented method for estimating a remaining value for a vehicle includes receiving sensor data for the vehicle associated with an impact event. For example, the sensor data includes timing data for the impact event. The computer-implemented method also includes determining a damage level based on the sensor data. The computer-implemented method further includes monitoring travel behavior of the vehicle for a predetermined amount of time after the impact event. The computer-implemented method yet further includes estimating a remaining value for the vehicle based on the damage level and the travel behavior of the vehicle.

20 Claims, 5 Drawing Sheets

(56) References Cited

U.S. PATENT DOCUMENTS

| | | | |
|---|---|---|---|
| 2005/0273218 A1* | 12/2005 | Breed | B60R 21/20 701/2 |
| 2006/0243055 A1* | 11/2006 | Sundermeyer | G01N 3/32 73/760 |
| 2007/0022805 A1* | 2/2007 | Reynolds | B60C 11/24 73/146 |
| 2010/0157061 A1* | 6/2010 | Katsman | G07C 5/0866 348/149 |
| 2014/0278572 A1* | 9/2014 | Mullen | B60R 21/00 705/4 |
| 2015/0039397 A1* | 2/2015 | Fuchs | G07C 5/008 705/7.35 |
| 2015/0105982 A1* | 4/2015 | Okamura | B60R 21/0132 701/45 |
| 2016/0144817 A1* | 5/2016 | Chambers | G08G 1/205 340/436 |
| 2017/0108342 A1* | 4/2017 | Foreman | G01C 21/3691 |
| 2017/0300834 A1* | 10/2017 | Ishida | G06Q 30/0284 |
| 2018/0108189 A1* | 4/2018 | Park | G07C 5/008 |
| 2018/0204394 A1* | 7/2018 | Dahl | G07C 5/008 |
| 2019/0228228 A1* | 7/2019 | Tsukahara | G07C 5/00 |
| 2020/0211303 A1* | 7/2020 | Walsh | G06N 20/00 |
| 2020/0334928 A1* | 10/2020 | Bourke | G06N 5/04 |
| 2021/0272208 A1* | 9/2021 | Leise | G06Q 40/08 |

FOREIGN PATENT DOCUMENTS

| | | | | |
|---|---|---|---|---|
| DE | 112005001678 T5 * | 9/2007 | | B60R 21/0136 |
| DE | 102010029204 | 11/2011 | | |
| DE | 102014227045 A1 * | 6/2016 | | G08B 21/02 |
| KR | 20080104206 A * | 12/2008 | | G06Q 40/08 |
| KR | 20160016211 A * | 2/2016 | | B62D 41/00 |
| WO | WO2015060805 A1 * | 4/2015 | | B26D 41/00 |

OTHER PUBLICATIONS

M. B. van Leeuwen and F. C. A. Groen, "Vehicle detection with a mobile camera: spotting midrange, distant, and passing cars," in IEEE Robotics & Automation Magazine, vol. 12, No. 1, pp. 37-43, Mar. 2005 (Year: 2005).*

S. Kamijo, Y. Matsushita, K. Ikeuchi and M. Sakauchi, "Traffic monitoring and accident detection at intersections," in IEEE Transactions on Intelligent Transportation Systems, vol. 1, No. 2, pp. 108-118, Jun. 2000 (Year: 2000).*

A. B. Faiz, A. Imteaj and M. Chowdhury, "Smart vehicle accident detection and alarming system using a smartphone," 2015 International Conference on Computer and Information Engineering (ICCIE), 2015, pp. 66-69, doi: 10.1109/CCIE.2015.7399319. (Year: 2015).*

* cited by examiner

SYSTEMS AND METHODS FOR ESTIMATING A REMAINING VALUE

BACKGROUND

A vehicle is one of the largest investments in a tangible good that a consumer typically makes. However because the value of the vehicle typically decreases with use, consumers are cognizant of the remaining value of the vehicle. Third parties with a stake in the vehicle are also savvy to the importance of the remaining value of the vehicle since the third parties are typically financially involved. For example, a leaser may attempt to track the remaining value as a residual value. The residual value is an estimate of the worth of the vehicle at the end of a lease term. A dealership may additionally or alternative attempt to track the remaining value as the resale value of the vehicle. The resale value is the vehicles worth after a sale due to depreciation caused by use, mileage, damage, etc. Remaining values, such as the residual value and the resale value allow consumers as well as third parties to make informed decisions about the vehicle.

BRIEF DESCRIPTION

According to one aspect, a computer-implemented method for estimating a remaining value for a vehicle includes receiving sensor data for the vehicle associated with an impact event. For example, the sensor data includes timing data for the impact event. The computer-implemented method also includes determining a damage level based on the sensor data. The computer-implemented method further includes monitoring travel behavior of the vehicle for a predetermined amount of time after the impact event. The computer-implemented method yet further includes estimating a remaining value for the vehicle based on the damage level and the travel behavior of the vehicle.

According to another aspect, a system for estimating a remaining value for a vehicle includes a data receiving module, a detection module, a monitor module, and an estimation module. The data receiving module receiving sensor data for the vehicle associated with an impact event. For example, the sensor data includes timing data for the impact event. The detection module determines a damage level based on the sensor data. The monitor module monitors travel behavior of the vehicle for a predetermined amount of time after the impact event. The estimation module estimates a remaining value for the vehicle based on the damage level and the travel behavior of the vehicle.

According to still another aspect, a non-transitory computer readable storage medium stores instructions that, when executed by a computer, which includes at least a processor, causes the computer to perform a method for estimating a remaining value for a vehicle. The method includes receiving sensor data for the vehicle associated with an impact event. For example, the sensor data includes timing data for the impact event. The method also includes determining a damage level based on the sensor data. The method further includes monitoring travel behavior of the vehicle for a predetermined amount of time after the impact event. The method yet further includes estimating a remaining value for the vehicle based on the damage level and the travel behavior of the vehicle.

DETAILED DESCRIPTION

As discussed above, consumers and third parties are able to make more informed decisions about a host vehicle when those decisions are based on a remaining value, such as a residual value or a resale value. The remaining value may be based on apparent vehicle characteristics of the host vehicle. For example, the remaining value may be based on a mileage that is readily apparent from the odometer. However, it may be more difficult to determine if the host vehicle has undergone numerous repairs, received routine maintenance, been in a collision, etc. because repairs and services may superficially correct these issues. Accordingly, it may not be apparent to one attempting to calculate remaining value that the host vehicle has had these issues in the past. Moreover, the consumer may be reluctant to report these issues as they may degrade the remaining value of the host vehicle.

Rather than relying on appearances or self-reporting, the host vehicle may be able to estimating a remaining value based on sensor information from the host vehicle itself as well as other vehicles, roadside equipment, infrastructure, etc. in the host vehicle's surroundings. For example, suppose that the host vehicle is involved in an accident. The host vehicle's sensors may register an impact, a rapid deceleration, airbag deployment, and sudden braking, among others as sensor data indicative of an impact event. Further suppose that a remote vehicle passing when the impact event occurs. The remote vehicle may transmit sensor data to the host vehicle. For example, the remote vehicle may transmit sensor data from image sensors with images of the collision. The sensor data can be correlated with timing data to determine when the impact event occurred. The sensor data also be used to determine the extent of damage to the host vehicle. Continuing the example from above, the images received from the remote vehicle may be used to determine a damage level for the host vehicle.

In addition to using sensor data regarding the impact event, the travel behavior of the host vehicle may be monitored after the impact event. The travel behavior may include the location of the host vehicle, the amount of time that the host vehicle is stationery, and the efficacy of vehicle systems of the host vehicle, among others. In one embodiment, the travel behavior of the host vehicle is compared to the prior behavior of the host vehicle to determine if the host vehicle has been negatively affected by the impact event. Based on the damage level and the travel behavior of the host vehicle, a remaining value is estimated for the host vehicle. Accordingly, the damage level and travel behavior can be detected using vehicle sensors and used to estimate a remaining value that is not dependent on issues from an impact event being apparent or self-reported. The remaining value may also be used to generate a model of the host vehicle that makes issues apparent. For example despite the host vehicle repaired, the model may illustrate the host vehicle as it was immediately following the impact event. Moreover, the remaining value may be accessed by the third parties as well as the consumer.

Definitions

The following includes definitions of selected terms employed herein. The definitions include various examples and/or forms of components that fall within the scope of a term and that can be used for implementation. The examples are not intended to be limiting. Furthermore, the components discussed herein, can be combined, omitted, or organized with other components or into different architectures.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, vehicle computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein can include input and/or output devices for receiving input and/or devices for outputting data. The input and/or output can be for controlling different vehicle features, which include various vehicle components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface, which can be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Consumer," as used herein can include, but is not limited to, one or more entities, such as a human being or business, that has indicated an interest in obtaining some form of ownership of a vehicle. The forms of ownership may include buying, leasing, renting, sharing, etc.

"Database," as used herein, is used to refer to a table. In other examples, "database" can be used to refer to a set of tables. In still other examples, "database" can refer to a set of data stores and methods for accessing and/or manipulating those data stores. A database can be stored, for example, at a disk, data store, and/or a memory.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "dealer," as used herein can include, but is not limited to, one or more entities, such as a human being or business, that provide opportunities for ownership of a vehicle, typically through a barter or pecuniary arrangement. The forms of ownership may include buying, leasing, renting, sharing, etc.

"Display," as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be accessible through various devices, for example, though a remote system. The display may also be physically located on a portable device, mobility device, or vehicle.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

"Vehicle," as used herein, refers to any moving vehicle that is capable of carrying one or more users and is powered by any form of energy. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is powered entirely or partially by one or more electric motors powered by an electric battery. The EV can include battery electric vehicles (BEV), plug-in hybrid electric vehicles (PHEV), and extended range electric vehicles (EREVs). The term "vehicle" can also refer to an autonomous vehicle and/or self-driving vehicle powered by any form of energy. The autonomous vehicle can carry one or more users. Further, the term "vehicle" can include vehicles that are automated or non-automated with pre-determined paths or free-moving vehicles.

"Vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), a climate control system, an electronic pretensioning system, a monitoring system, a passenger detection system, a vehicle suspension system, a vehicle seat configuration system, a vehicle cabin lighting system, an audio system, a sensory system, an interior or exterior camera system among others.

I. System Overview

Figure 1:
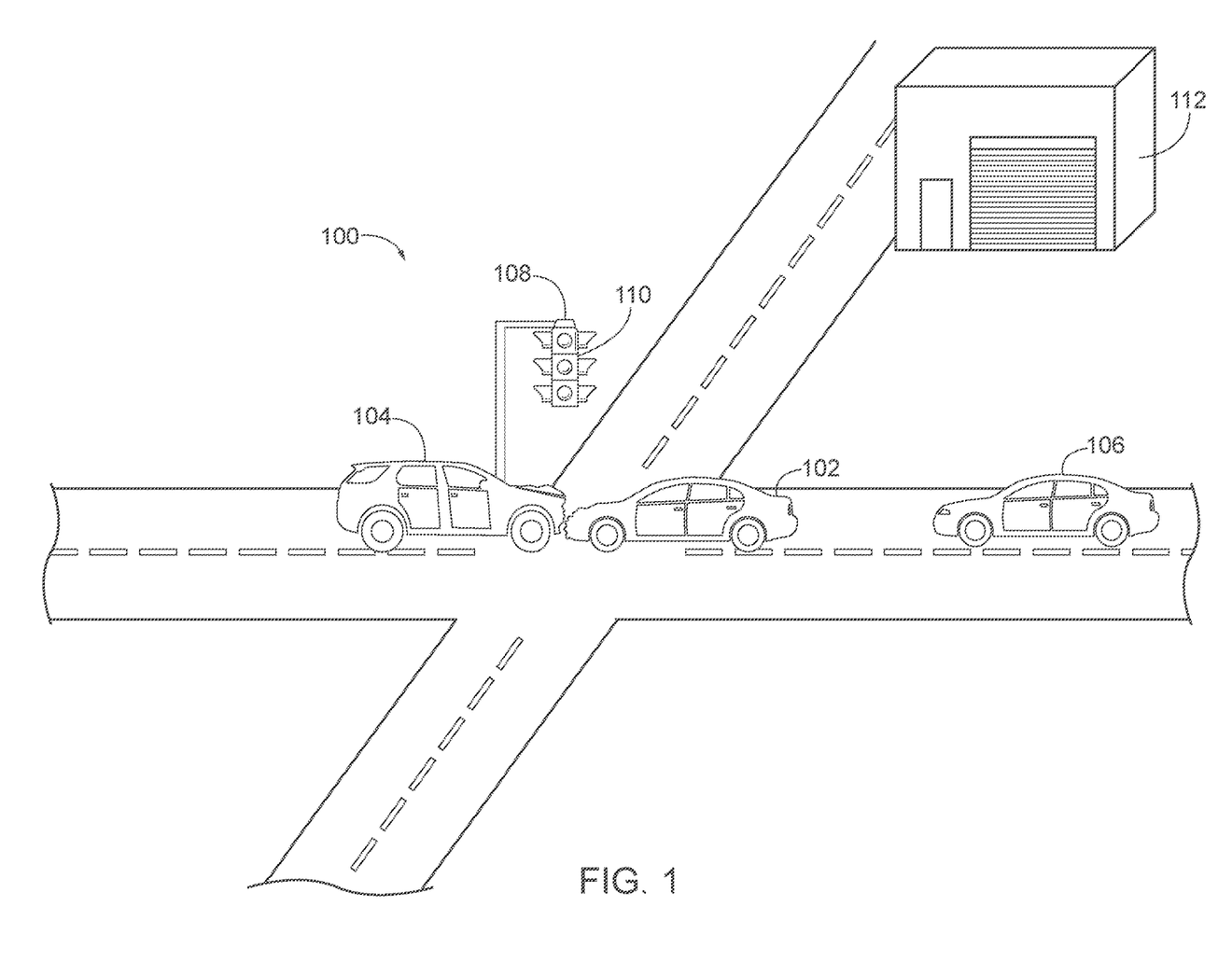
FIG. 1 is a schematic view of a driven vehicle in an exemplary traffic scenario according to an exemplary embodiment.

Referring now to the drawings, the showings are for purposes of illustrating one or more exemplary embodiments and not for purposes of limiting the same. FIG. 1 is a schematic view of an exemplary traffic scenario on roadways 100 forming an intersection according to an exemplary embodiment. The roadways 100 can include any type of path, road, highway, freeway, or travel route. The roadways 100 can have various configurations not shown in FIG. 1. For example, the roadways 100 can have any number of lanes or use any number of paths. The roadways 100 are traversed by one or more vehicles, such as a host vehicle 102, an opposing vehicle 104, and a remote vehicle 106.

In FIG. 1, the roadways 100 illustrate an example physical environment of the host vehicle 102. The host vehicle 102 is a vehicle currently and/or previously used by a consumer (not shown). The opposing vehicle 104 may be travelling in the same direction or a different direction than the host vehicle 102. Likewise the remote vehicle 106 may also be traversing the roadways 100 in the same direction or a different direction than the host vehicle 102. Furthermore, the roadways 100 may include roadside equipment and/or infrastructure with sensor capability. For example, the intersection may be managed by a traffic light 110 having an image sensor 108. The physical environment of the host vehicle 102 may also include buildings such as building 112.

Sensor data from one or more of the host vehicle 102, the opposing vehicle 104, the remote vehicle 106, the image sensor 108 of the traffic light 110, etc. may capture information about events on the roadways 100. For example, suppose that the host vehicle 102 and the opposing vehicle 104 are involved in an accident. The sensor data the sensor data may be stored and utilized by an operating environment, such as operating environment 200 of FIG. 2.

Figure 2:
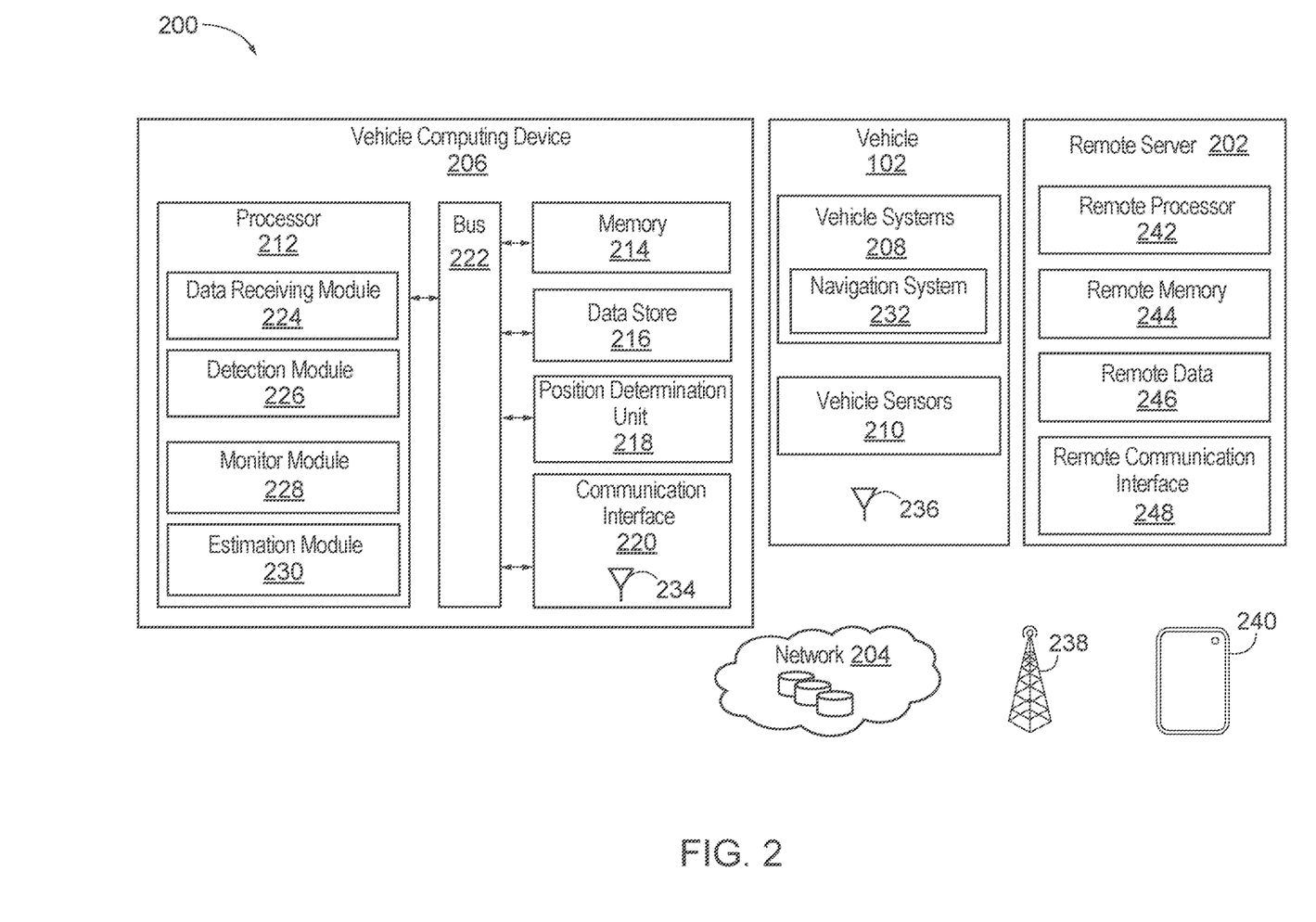
FIG. 2 is a block diagram of an operating environment for estimating a remaining value for a host vehicle according to an exemplary embodiment.

FIG. 2, a block diagram of the operating environment 200 for estimating a remaining value for the host vehicle 102 according to an exemplary embodiment. One or more of the components of the operating environment 200 can be considered in whole or in part a vehicle communication network. The host vehicle 102 communicates with the opposing vehicle 104, the remote vehicle 106, and/or a remote server 202 over a network 204. A vehicle computing device (VCD) 206 may be provided at the host vehicle 102, the remote server 202, or other remote location operably connected to the host vehicle 102 and/or the remote server 202 via the network 204. Vehicle systems 208 and vehicle sensors 210 communicate information about the host vehicle 102 to the VCD 206.

Generally, the VCD 206 includes a processor 212, a memory 214, a data store 216, a position determination unit 218, and a communication interface 220, which are each operably connected for computer communication via a bus 222 and/or other wired and wireless technologies defined herein. The VCD 206, can include provisions for processing, communicating, and interacting with various components of the host vehicle 102 and other components of the operating environment 200. In one embodiment, the VCD 206 can be implemented with the host vehicle 102, for example, as part of a telematics unit, a head unit, an infotainment unit, an electronic control unit, an on-board unit, or as part of a specific vehicle control system, among others. In other embodiments, the VCD 206 can be implemented remotely from the host vehicle 102, for example, with a portable device 240 or the remote server 202, connected via the network 204.

The processor 212 can include logic circuitry with hardware, firmware, and software architecture frameworks for remote control of the host vehicle 102 by multiple operators. Thus, in some embodiments, the processor 212 can store application frameworks, kernels, libraries, drivers, application program interfaces, among others, to execute and control hardware and functions discussed herein. For example, the processor 212 can include a data receiving module 224, a detection module 226, a monitor module 228, and an estimation module 230, although it is understood that the processor 212 can be configured into other architectures.

The memory 214 and/or the data store 216 may store data about the host vehicle 102, such as the sensor data. Further, in some embodiments, the memory 214 and/or the data store 216 can store similar components as the processor 212 for execution by the processor 212. The modules of the processor 212 may access the position determination unit 218 via the bus 222. The position determination unit 218 can include hardware (e.g., sensors) and software to determine and/or acquire position data about the host vehicle 102. For example, the position determination unit 218 can include a global positioning system (GPS) unit (not shown) and/or an inertial measurement unit (IMU) (not shown). Thus, the position determination unit 218 can provide a geo-position of the host vehicle 102 based on satellite data from, for example, a global position source (not shown), or from any Global Navigational Satellite infrastructure (GNSS), including GPS, Glonass (Russian) and/or Galileo (European). Further, the position determination unit 218 can provide dead-reckoning data or motion data from, for example, a gyroscope, accelerometer, magnetometers, among other vehicle sensors 210. In some embodiments, the position determination unit 218 can be a component of the navigation system 232 of the vehicle systems 208 that provides navigation maps and navigation information to the host vehicle 102.

The communication interface 220 can include software and hardware to facilitate data input and output between the components of the VCD 206 and other components of the operating environment 200. Specifically, the communication interface 220 can include network interface controllers (not shown) and other hardware and software that manages and/or monitors connections and controls bi-directional data transfer between the communication interface 220 and other components of the operating environment 200 using, for example, the network 204.

More specifically, in one embodiment, the VCD 206 can exchange data and/or transmit data, such as the sensor data, with other operably connected devices via a transceiver 234 or other communication hardware and protocols. For example, the transceiver 234 can exchange data with a vehicle occupant, consumer, or manufacturer of the host vehicle 102. In some embodiments, the host vehicle 102 can also exchange data (e.g., sensor data as will be described herein) over remote networks by utilizing a wireless network antenna 236, roadside equipment 238, the portable device, and/or the network 204 (e.g., a wireless communication network), or other wireless network connections.

Referring again to the host vehicle 102, the vehicle systems 208 can include any type of vehicle control system and/or vehicle described herein to enhance the host vehicle 102 and/or driving of the host vehicle 102. For example, the vehicle systems 208 can include autonomous driving systems, remote control systems, driver-assist systems, adaptive cruise control systems, or any other advanced driving assistance systems (ADAS). Here, the vehicle systems 208 may include a navigation system 232. The navigation system 232 stores, calculates, and provides route and destination information and facilitates features like turn-by-turn directions.

The vehicle sensors 210, which can be implemented with the vehicle systems 208, can include various types of sensors for use with the host vehicle 102 and/or the vehicle systems 208 for detecting and/or sensing a parameter of the host vehicle 102, the vehicle systems 208, and/or the environment surrounding the host vehicle 102. For example, the vehicle sensors 210 can provide data about vehicles and/or downstream objects in proximity to the host vehicle 102. For example, the vehicle sensors 210 can include, but are not limited to: acceleration sensors, speed sensors, braking sensors, proximity sensors, vision sensors, ranging sensors, seat sensors, seat-belt sensors, door sensors, environmental sensors, yaw rate sensors, steering sensors, GPS sensors, among others. It is also understood that the vehicle sensors 210 can be any type of sensor, for example, acoustic, electric, environmental, optical, imaging, light, pressure, force, moisture, thermal, temperature, proximity, among others.

Using the system and network configuration discussed above, a remaining value of the host vehicle 102 can be estimated. The remaining value may be provided to a consumer or a third party to facilitate the consumer or third party making more informed decisions regarding the host vehicle 102. Detailed embodiments describing exemplary methods using the system and network configuration discussed above will now be discussed in detail.

II. Methods for Estimating a Remaining Value

Figure 3:
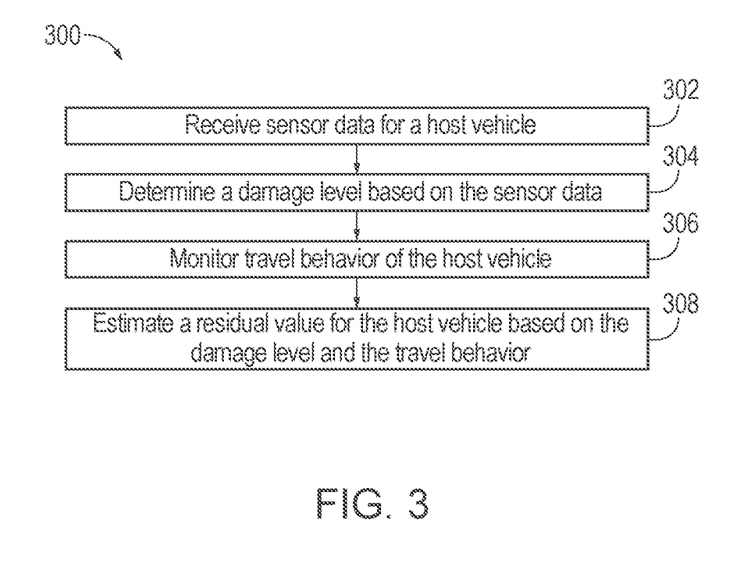
FIG. 3 is a process flow for estimating a remaining value for a host vehicle according to an exemplary embodiment.

Referring now to FIG. 3, a method 300 for estimating a remaining value for the host vehicle 102 according to an exemplary embodiment. FIG. 3 will also be described with reference to FIGS. 1, 2, 4, and 5. As shown in FIG. 3, the method 300 can be described by a number of steps for estimating the remaining value for the host vehicle 102. For simplicity, the method 300 will be described by these steps, but it is understood that the steps of the method 300 can be organized into different architectures, blocks, stages, and/or processes.

At block 302, the method 300 includes the data receiving module 224 receiving sensor data associated with the host vehicle 102. The sensor data may be received from the host vehicle 102, the opposing vehicle 104, the remote vehicle 106, the image sensor 108 of the traffic light 110, the remote server 202, and/or the portable device 240 over the network 204. For example, the sensor data may include information regarding the appearance and/or operation of the host vehicle 102.

Suppose that the host vehicle 102 and the opposing vehicle 104 are involved in an impact event in which the host vehicle 102 and the opposing vehicle 104 make contact with one another. The sensor data associated with the host vehicle 102 may include information regarding the appearance and/or operation of the host vehicle 102 at or around the time of the accident. For example, the host vehicle 102 may have a light sensor (not shown) that rotates 360 degrees around the host vehicle 102 and collect sensor data from the physical area of the host vehicle 102 in sweeps. Conversely, the light sensor may be omnidirectional and collect sensor data from all directions in the physical environment simultaneously. In this manner, the host vehicle 102 may be capable of emitting one or more laser beams of ultraviolet, visible, or near infrared light using the vehicle sensors 210 to collect sensor data that is indicative of the appearance of the host vehicle 102, the opposing vehicle 104, and/or the environment of the vehicles. In this manner, the host vehicle 102 may collect sensor data regarding the opposing vehicle 104 including sensor data about the license plate number, make, model, color, dent, missing part(s), car wash status, driver/passenger(s) and loading status etc.

The sensor data may also include information from the vehicle systems 208 and/or the vehicle sensors 210 regarding the operation of the host vehicle 102. In some embodiments, the vehicle systems 208 and/or the vehicle sensors 210 may include sensors that detect or react to an impact event. For example, the vehicle systems 208 and/or the vehicle sensors 210 may include electrical circuits for triggering passive safety arrangements, such as airbags, safety belt tighteners, in case of vehicle accidents or impending vehicle accidents including means for detecting collisions, impending collisions or roll-over responsive to actual contact with an obstacle, and vehicle crush sensors, among others. Additionally, the vehicle systems 208 and/or the vehicle sensors 210 may include speed, accelerometers, gyroscopes, positioning, and antilock brake sensors.

The sensor data may include timing data associated with the information received from vehicle systems 208 and/or the vehicle sensors 210. Accordingly, the sensor data can be associated with a time such that it can be determined when the sensor data was captured, when the vehicle systems 208 and/or the vehicle sensors 210 was triggered, or when the subject of sensor data was sensed. For example, suppose that the navigation system 232 may provide global position system (GPS) telemetry including timing data so that it can be determined when a vehicle, such as the host vehicle 102, was at a particular location. The timing data may be a single value, such as a specified time or a range of values, such as a range of times from a start time to an end time, and/or a timeline, among others.

The remote server 202 may include a remote processor 242 and a remote memory 244 that generates and/or stores sensor data as the remote data 246. For example, the image sensor 108 of the traffic light 110 may store sensor data, including captured images and/or video on the remote memory 244 as the remote data 246. In one embodiment, the data receiving module 224 may access the remote data 246 via the remote communications interface 248 to access the sensor data. Accordingly, the sensor data may be aggregated from one or more remote sources.

The data receiving module 224 may automatically receive the sensor data, as for example, a function of proximity. Additionally, the data receiving module 224 may also query and/or access sensor data on the host vehicle 102, the opposing vehicle 104, the remote vehicle 106, the image sensor 108 of the traffic light 110, the remote server 202, and/or the portable device 240. For example, the vehicle systems 208 and the vehicle sensors 210 may automatically provide sensor data regarding the host vehicle 102 to the data receiving module 224.

The sensor data may also include a driving profile associated with the host vehicle 102. For example, the sensor data may include information about the manner in which the consumer operates the host vehicle 102. Additionally or alternatively, the data receiving module 224 may determine a driving profile or supplement a driving profile based on the data received in the sensor data, the vehicle systems 208, or the vehicle sensors 210. For example, suppose that the driving profile includes categorizations of the consumer's driving style (e.g., power, sporty, aggressive, relaxed, fuel efficient, etc.), the data receiving module 224 may receive braking data from the vehicle sensors 210 to identify the consumer's driving style. Accordingly, the data receiving module 224 may assess and/or generate profile data associated with a driving profile based on vehicle data from the vehicle systems 208 and/or the vehicle sensors 210. In this manner, the sensor data may address the consumer's style of driving, in addition to the host vehicle 102.

In another embodiment, the data receiving module 224 may calculate sensor data. For example, the data receiving module 224 may receive location data from the position determination unit 218 and identify a location associated with the sensor, thereby generating sensor data. Suppose that the host vehicle 102 is stationary in an off-state at the building 112 in excess of a predetermined time. The data receiving module 224 may access the position determination unit 218 and/or the navigation system 232 to determine that the building 112 is a repair shop for vehicles. The data receiving module 224 may also generate the timing data by timestamping the sensor data. For example, the data receiving module may timestamp the sensory data based on information from the vehicle systems 208 and/or the vehicle sensors 210 or when the sensor is received.

The data receiving module 224 may identify an impact event for the host vehicle 102 based on the sensor data. For example, the impact event may be indicative of the host vehicle 102 being involved in a collision with an obstacle. Suppose the host vehicle 102 makes contact with the opposing vehicle 104 as shown in FIG. 1. The accelerometer may provide sensor data to the data receiving module 224 that indicates that the host vehicle 102 came to an abrupt stop. The data receiving module 224 may identify the impact event based on the rate of braking.

The data receiving module 224 may detect an impact event of the host vehicle 102 by comparing the sensor data to a predetermined threshold. For example, the data receiving module 224 may identify an impact event when the rate of braking exceeds a predetermined threshold. Alternatively, the impact event may be identified based on the activation of the passive safety arrangements, such as the airbags or safety belt tighteners.

In another embodiment, the impact event may be based on multiple parameters of the sensor data. For example, the data receiving module 224 may identify an impact event when both the rate of braking exceeds the predetermined threshold and the air bag is activated. Additionally or alternatively, the impact event may be user specific. For example, the data receiving module 224 may modify a predetermined threshold based on the driving profile associated with the host vehicle 102. Suppose that the driving profile indicates an aggressive driving style. The data receiving module 224 may increase one or more of the predetermined thresholds for the rate of braking. Furthermore, the consumer may alter the one or more of the predetermined thresholds. Accordingly, identification of an impact event can be tailored to the host vehicle 102.

At block 304, the method 300 includes determining a damage level from a plurality of damage levels based on the sensor data. The detection module 226 determines the damage level associated with the impact event. A damage level of the plurality of damage levels may be proportional to the amount of damage to the appearance and/or the operation of the host vehicle 102. The damage levels may be associated with numerical damage values, names, categories, etc. In some embodiments, the damage levels may be indicative of the severity of the damage. For example the plurality of damage levels may extend along a range from a nominal damage level to a severe damage level. Furthermore, the nominal damage level and the severe damage level may be separated by any number of intermediary damage levels that vary in severity between the nominal damage level and the sever damage level. The nominal damage level may include cosmetic issues including surface scratches, dents, etc., while the severe damage level may include damage that render one or more of the vehicle systems 208 non-operational.

The detection module 226 determines the damage level based on the sensor data. In one embodiment, the detection module 226 may determine the damage level based on the sources of the sensor data. Continuing the example from above, the detection module 226 may determine the damage level is nominal when an image sensor detects a deviation from an original state of the exterior of the host vehicle 102 but none of the vehicle systems 208 and/or the vehicle sensors 210 is affected. The damage level may increase in severity based on the number of the vehicle systems 208 and/or the vehicle sensors 210 affected by the impact event. In another embodiment, the damage levels may be based on a series of damage thresholds. For example, a first threshold may include cosmetic damage. A second threshold may include the first threshold and additionally a malfunction of a system of the vehicle systems 208 or a sensor of the vehicle sensors 210. Accordingly, the damage levels may be discrete or continuous.

At block 306, the method 300 includes monitoring travel behavior of the host vehicle 102 for a predetermined amount of time after the impact event. The travel behavior includes information about how the host vehicle 102 is operated. For example the travel behavior may include trip log data regarding one or more of the trips made by the host vehicle 102. For example, the travel behavior may include the trip log data, one or more trips, an origin the origin of a trip, the destination of a trip, the start time, the end time, the duration time of the trip, the dwell time of the host vehicle 102 at a location, the mileage, the type of location, etc.

Suppose that the host vehicle 102 is in an impact event at an initial time. Following the initial time, the travel behavior is monitored for the host vehicle 102. In this example, the travel behavior may include the dwell time of the host vehicle 102 at the location of the impact event with the opposing vehicle. The travel behavior may further include a trip from the location of the impact event to a next location, for example, the building 112, and or the duration time of the trip including the amount of time it took the host vehicle to traverse the distance between the impact event and the next location. The travel behavior may also include the dwell time of the host vehicle 102 at the building 112.

The travel behavior may be monitored continually for the host vehicle 102. Alternatively, monitoring the travel behavior of the host vehicle 102 may be triggered by the impact event. Thus, in some embodiment, the travel behavior of the host vehicle 102 may be monitored after the impact event. The travel behavior may be monitored for a predetermined amount of time. For example, the travel behavior may be monitored following the impact event for an amount of monitor time based on the damage level. The monitor time associated with the nominal damage level may be less that the monitor time associated with more severe damage levels, such as the intermediary damage levels and the severe damage level.

In some embodiments, the monitor module 228 may assess the travel behavior with a behavior value based on the nature for the behavior. The behavior value quantifies the travel behavior. For example, the behavior value may be a value on a scale based on the degree to which the behavior is typical of the host vehicle 102. Suppose that the building 112 is a repair garage. The monitor module 228 may assess a high behavior value if the dwell time of the host vehicle 102 at the building 112 exceeds an expected threshold. However, the monitor module 228 may assess a lower behavior value if the building 112 is the residence of the consumer and/or housing the host vehicle 102 at the building is a typical.

The behavior value may also be based on a baseline comparison of the typical behavior of the host vehicle 102 with the travel behavior after the impact event. The behavior value may also be based on an aggregated baseline of the way vehicles are typically operated or the way vehicles are operated after an impact event. The comparison may be based on the manner in which the host vehicle 102 deviates from normal operation, and the behavior value may be calculated as a percentage, standard deviation, etc. Accordingly, in some embodiments, the monitor module 228 may quantify the travel behavior as a discrete value.

Although described with respect to the host vehicle 102, the monitor module 228 may also use the collected sensor data regarding the opposing vehicle 104. Suppose that the host vehicle 102 collects sensor data regarding an opposing vehicle 104 on the roadway 100 and the monitor module 228 may determine that the opposing vehicle 104 is defective. For example, the monitor module 228 may determine that a headlight is out on the opposing vehicle 104. Suppose the data receiving module 224 also receives information regarding vehicle identification number, license plate number, or other identifying information about the opposing vehicle. The monitor module 228 may access the remote server 202 to alert a third party. In some embodiments, the third party may be a dealer or other entity capable of correcting the defect.

At block 308, the method 300 includes estimating a remaining value for the host vehicle 102 based on the damage level and the travel behavior of the host vehicle 102. The estimation module 230 estimates a remaining value of the host vehicle 102 which may be indicative of any changes in value due to the impact event. The remaining value may be estimate may be based on the relationship of the damage level to the travel behavior. For example, the remaining value may be based on the product of the damage level (e.g., a damage level) and the travel behavior (e.g., behavior value). Accordingly, even if the damage level is relatively nominal if the travel behavior is indicative of issues, for example, the host vehicle 102 is not used for an extended period of time, then the remaining value may reflect the impact event to a moderate degree in the value of the host vehicle 102. The remaining value may be a monetary value, general numerical value, or other value.

As another example, if the damage level is relatively nominal and the travel behavior is not indicative of issues, then the remaining value may reflect the impact event to a lesser degree in the value of the host vehicle 102. If the damage level is relatively severe and the travel behavior is indicative of issues (e.g., a typical), then the remaining value may reflect the impact event to a higher degree in the value of the host vehicle 102. This is one example of a manner in which the estimation module 230 would estimate the remaining value, however, other metrics may be used. For example, the relation between the damage level and the travel behavior may be additive.

Figure 4:
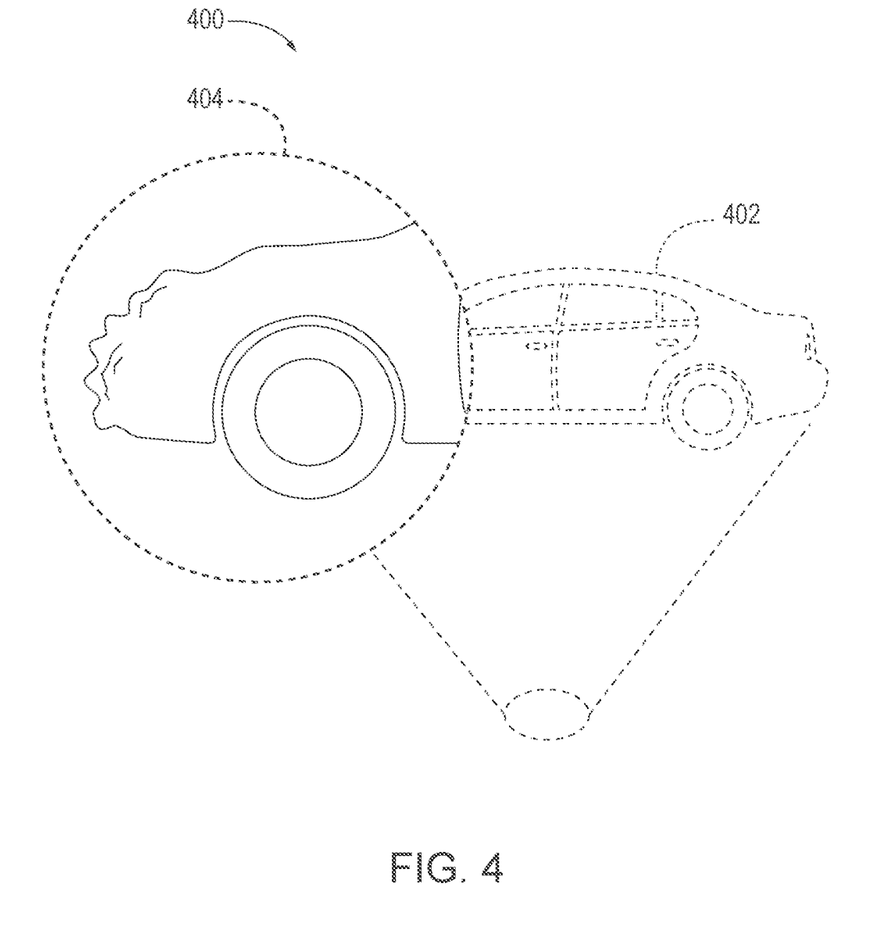
FIG. 4 is a remaining value having a model representation of the host vehicle according to an exemplary embodiment.

The remaining value may additionally or alternatively be a model representation of the remaining. Turning to FIG. 4, the model representation 400 of the host vehicle 102 may be an image of the vehicle that can be illustrated. For example, the model representation 400 may be an image that is projected, such as a hologram, or displayed on a display.

The model representation 400 may include a vehicle model 402 and/or a issue window 404. The vehicle model 402 illustrates an impact state of the host vehicle 102. The impact state is indicative of any issues and/or damage the host vehicle suffered due to the impact event. The vehicle model 402 may be rendered based on the damage level determined by the detection module 226. Additionally or alternatively, the vehicle model 402 may be based on the sensor data. For example, the data receiving module 224 may receive sensor data that can be translated in the vehicle model 402. Suppose the data receiving module 224 receives image data from the remote vehicle 106 that captures the host vehicle 102. The image data can be used to render the vehicle model 402.

The issue window 404 may identify a particular issue of the host vehicle 102 and draw attention to that issue by making that area of the vehicle model 402 visually dominant. For example, the issue window 404 may zoom in on an area of the vehicle model 402. Suppose that the host vehicle 102 suffers front-end damage in the impact event. The issue window 404 may illustrate the front end of the host vehicle 102 in greater detail by zooming in on the front-end. Additionally or alternatively, the issue window 404 may highlight, color code, move, and/or pulse the area of the vehicle model 402.

In some embodiments, the issue window 404 may be a selectable feature of the vehicle model 402. For example, suppose that a braking system of the vehicle systems 208 was rendered inoperable by the impact event. The vehicle model 402 may include a readout that allows the braking system to be the focus of the issue window 404.

Accordingly, the remaining value may include may be able to give both a value indicative of the post-impact monetary value of the host vehicle 102 as well as a visual representation of the impact state of the host vehicle 102. The consumer as well as a third party may use the remaining value for maintenance reminders, upsell marketing, customer care, usage based insurance, etc. Furthermore, while the systems and methods described herein are described with respect to vehicles, other applications are envisioned. For example, the systems and methods described herein may be used to estimate a remaining value for a lot of land or a building after a climate event.

Figure 5:
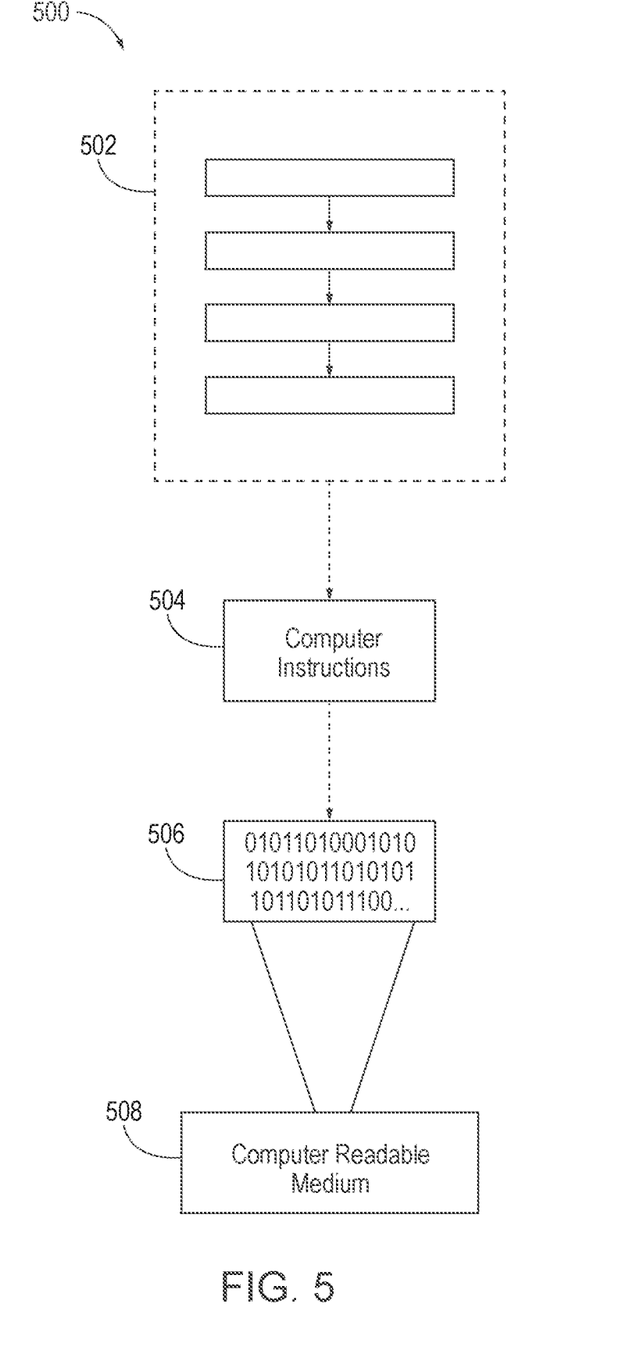
FIG. 5 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the method 300 of FIG. 3. In another aspect, the processor-executable computer instructions 504 may be configured to implement a system, such as the operating environment of FIG. 2. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

The embodiments discussed herein may also be described and implemented in the context of computer-readable storage medium storing computer executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data. Computer-readable storage media excludes non-transitory tangible media and propagated data signals.

The invention claimed is:

1. A computer-implemented method for estimating a remaining value for a host vehicle, comprising:
    processing host vehicle sensor data for the host vehicle from one or more vehicle systems and vehicle sensors of the host vehicle;
    identifying a driving profile, associated with the host vehicle, that includes a user specific predetermined threshold based on driving style;
    determining an occurrence of an impact event by comparing the host vehicle sensor data of the host vehicle to the user specific predetermined threshold, wherein the host vehicle sensor data includes timing data for the impact event;
    receiving remote sensor data associated with the host vehicle from one or more remote sources including an opposing vehicle, a remote vehicle, and a remote server based on the timing data in response to the impact event;
    determining a damage level indicative of the severity of the damage to the host vehicle based on the host vehicle sensor data and the remote sensor data, wherein the damage level increases in severity based on a number of the vehicle systems or the vehicle sensors of the host vehicle affected by the impact event;
    monitoring travel behavior of the host vehicle for a predetermined amount of time after the impact event; wherein the predetermined amount of time is proportional to the damage level; and
    estimating the remaining value for the host vehicle based on the damage level and the travel behavior of the host vehicle.

2. The computer-implemented method of claim 1, wherein the damage level is also based on an amount of damage to the appearance of the host vehicle.

3. The computer-implemented method of claim 1, wherein the remaining value may be based on a product of the damage level and the travel behavior, and wherein the travel behavior is assessed as a behavior value that quantifies the travel behavior.

4. The computer-implemented method of claim 1, wherein determining the damage level further comprises:
    identifying an issue based on the remote sensor data;
    determining a first damage level;
    confirming the issue based on host vehicle sensor data; and
    increasing the first damage level to a second damage level.

5. The computer-implemented method of claim 1, wherein the remote sensor data includes navigation system data received from a portable device.

6. The computer-implemented method of claim 1, further comprising:
    generating a vehicle model that illustrates an impact state of the host vehicle, wherein the impact state is indicative of damage incurred by the host vehicle due to the impact event.

7. The computer-implemented method of claim 6, wherein the vehicle model includes an issue window that makes area of the vehicle model visually dominant.

8. The computer-implemented method of claim 1, wherein the travel behavior includes trip log data for a plurality of trips made by the host vehicle during the predetermined amount of time.

9. The computer-implemented method of claim 8, wherein the trip log data includes a location of the impact event, a next location following the impact event, and a dwell time of the host vehicle at the next location.

10. A system for estimating a remaining value for a host vehicle, comprising:
    a memory storing instructions when executed by a processor cause the processor to:
    process host vehicle sensor data for the host vehicle from one or more vehicle systems and vehicle sensors of the host vehicle;
    identify a driving profile, associated with the host vehicle, that includes a user specific predetermined threshold based on driving style;
    determine an occurrence of an impact event by comparing the host vehicle sensor data of the host vehicle to the user specific predetermined threshold, wherein the host vehicle sensor data includes timing data for the impact event;
    receive remote sensor data associated with the host vehicle from one or more remote sources including an opposing vehicle, a remote vehicle, and a remote server based on the timing data in response to the impact event;
    determine a damage level indicative of the severity of the damage to the host vehicle based on the host vehicle sensor data and the remote sensor data, wherein the damage level increases in severity based on a number of the vehicle systems or the vehicle sensors of the host vehicle affected by the impact event;
    monitor travel behavior of the host vehicle for a predetermined amount of time after the impact event; wherein the predetermined amount of time is proportional to the damage level; and
    estimate the remaining value for the host vehicle based on the damage level and the travel behavior of the host vehicle.

11. The system of claim 10, wherein the remaining value may be based on a product of the damage level and the travel behavior, and wherein the travel behavior is assessed as a behavior value that quantifies the travel behavior.

12. The system of claim 10, wherein the memory further stores instructions when executed by a processor cause the processor to determine the damage level by:
    identifying an issue based on the remote sensor data;
    determining a first damage level;
    confirming the issue based on host vehicle sensor data; and
    increasing the first damage level to a second damage level.

13. The system of claim 10, wherein the memory further stores instructions when executed by a processor cause the processor to generate a vehicle model that illustrates an impact state of the host vehicle, wherein the impact state is indicative of damage incurred by the host vehicle due to the impact event.

14. The system of claim 10, wherein the travel behavior includes trip log data for a plurality of trips made by the host vehicle during the predetermined amount of time.

15. The system of claim 14, wherein the trip log data includes a location of the impact event, a next location following the impact event, and a dwell time of the host vehicle at the next location.

16. A non-transitory computer readable storage medium storing instructions that, when executed by a computer, which includes at least a processor, causes the computer to perform a method for estimating a remaining value for a host vehicle, the method comprising:
- processing host vehicle sensor data for the host vehicle from one or more vehicle systems and vehicle sensors of the host vehicle;
- identifying a driving profile, associated with the host vehicle, that includes a user specific predetermined threshold based on driving style;
- determining an occurrence of an impact event by comparing the host vehicle sensor data of the host vehicle to the user specific predetermined threshold, wherein the host vehicle sensor data includes timing data for the impact event;
- receiving remote sensor data associated with the host vehicle from one or more remote sources including an opposing vehicle, a remote vehicle, and a remote server based on the timing data in response to the impact event;
- determining a damage level indicative of the severity of the damage to the host vehicle based on the host vehicle sensor data and the remote sensor data, wherein the damage level increases in severity based on a number of the vehicle systems or the vehicle sensors of the host vehicle affected by the impact event;
- monitoring travel behavior of the host vehicle for a predetermined amount of time after the impact event; wherein the predetermined amount of time is proportional to the damage level; and
- estimating the remaining value for the host vehicle based on the damage level and the travel behavior.

17. The non-transitory computer readable storage medium of claim 16, wherein the remaining value may be based on a product of the damage level and the travel behavior, and wherein the travel behavior is assessed as a behavior value that quantifies the travel behavior.

18. The non-transitory computer readable storage medium of claim 16, wherein determining the damage level further comprises:
- identifying an issue based on the remote sensor data;
- determining a first damage level;
- confirming the issue based on host vehicle sensor data; and
- increasing the first damage level to a second damage level.

19. The non-transitory computer readable storage medium of claim 16, further comprising:
- generating a vehicle model that illustrates an impact state of the host vehicle, wherein the impact state is indicative of damage incurred by the host vehicle due to the impact event.

20. The non-transitory computer readable storage medium of claim 16, wherein the travel behavior includes trip log data for a plurality of trips made by the host vehicle during the predetermined amount of time.

* * * * *